(12) United States Patent
Sudhakar et al.

(10) Patent No.: US 8,068,566 B2
(45) Date of Patent: Nov. 29, 2011

(54) UNIFIED MULTI-MODE RECEIVER DETECTOR

(75) Inventors: Raghavan Sudhakar, Mountain View, CA (US); Veerendra Bhora, Sunnyvale, CA (US); Kamal J. Koshy, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 683 days.

(21) Appl. No.: 11/888,228

(22) Filed: Jul. 31, 2007

(65) Prior Publication Data

US 2009/0034662 A1 Feb. 5, 2009

(51) Int. Cl.
*H03D 1/00* (2006.01)
(52) U.S. Cl. ........ 375/341; 375/260; 375/262; 375/144; 375/265; 370/203; 370/264; 370/329; 714/755; 714/758
(58) Field of Classification Search .................. 375/341, 375/144, 262, 260, 265; 714/755, 758; 370/264, 370/203, 329
See application file for complete search history.

(56) References Cited

U.S. PATENT DOCUMENTS

| | | | |
|---|---|---|---|
| 6,470,043 B1* | 10/2002 | Lo et al. | 375/144 |
| 7,146,134 B2* | 12/2006 | Moon et al. | 455/67.11 |
| 2003/0235147 A1* | 12/2003 | Walton et al. | 370/204 |
| 2005/0075081 A1* | 4/2005 | Catreux-Erceg et al. | 455/78 |
| 2006/0067277 A1* | 3/2006 | Thomas et al. | 370/334 |
| 2008/0181094 A1* | 7/2008 | Lou et al. | 370/203 |
| 2009/0190682 A1* | 7/2009 | Ouyang et al. | 375/262 |

OTHER PUBLICATIONS

Bottomley, et al., "Adaptive Arrays and MLSE Equalization", *IEEE*, (1995), pp. 50-54.
Foschini, "Layered Space-Time Architecture for Wireless Communication in a Fading Environment When Using Multi-Element Antennas", *Bell Labs Technical Journal*, (1996), pp. 41-60.
Hassibi, et al., "On the Sphere-Decoding Algorithm I. Expected Complexity", *IEEE Transactions on Signal Processing*, vol. 53, No. 8, (2005), pp. 2806-2818.
Higuchi, et al., "Likelihood Function for QRM-MLD Suitable for Soft-Decision Turbo Decoding and its Performance for OFCDM MIMO Multiplexing in Multipath Fading Channel", *IEEE*, (2004), pp. 1142-1148.
Kim, et al., "Joint Detection and Channel Estimation Algorithms for QS-CDMA Signals Over Time-Varying Channels", *IEEE Transactions on Communications*, vol. 50 No. 5, (2002), pp. 845-855.
Liu, et al., "Near-Optimum Soft Decision Equalization for Frequency Selective MIMO Channels", *IEEE Transactions on Singal Processing*, vol. 52 No. 3, (2004), pp. 721-733.
Wolniansky, et al., "V-BLAST: An Architecture for Realizing Very High Data Rates Over the Rich-Scattering Wireless Channel", *Bell Laboratories, Lucent Technologies, Crawford Hill Laboratory*, NJ, USA, pp. 1-6, 1998.
Zelst, Van "Per-Antenna-Coded Schemes for MIMO OFDM", *IEEE*, (2003), pp. 2832-2836.
Alamouti, "A Simple Transmit Diversity Technique for Wireless Communications", *IEEE Journal on Select Areas in Communications*, vol. 16, No. 8 (1998), pp. 1451-1458.

* cited by examiner

*Primary Examiner* — Eva Puente
(74) *Attorney, Agent, or Firm* — Douglas J. Ryder; Ryder, Lu, Mazzeo and Konieczny, LLC

(57) ABSTRACT

In general, in one aspect, the disclosure describes a unified simplified maximum likelihood detector to be utilized with multiple input multiple output (MIMO) receivers to estimate transmitted signals. The unified detector includes a common framework capable of being utilized for multiple detection modes and multiple MIMO configurations.

20 Claims, 4 Drawing Sheets

| # | Operation |
|---|---|
| 1 | Extract the column vectors $r$, $h_1$ and $h_2$ |
| 2 | Compute $\|h_1\|^2$ and $\|h_2\|^2$ |
| 3 | Compute their reciprocals |
| 4 | Compute $h_1^H h_2$ |
| 5 | Compute $h_1^H r$ and $h_2^H r$ |
| 6 | Compute $(\|h_2\|^2)^{-1} h_2^H r$, $(\|h_1\|^2)^{-1} h_1^H r$, $(\|h_2\|^2)^{-1} (h_1^H h_2)^H$, $(\|h_1\|^2)^{-1} (h_1^H h_2)$ |
| 7 | Store two lookup tables: $\|h_1\|^2 \|s_1\|^2$ and $\|h_2\|^2 \|s_2\|^2$ |
| 8 | Get sliced MRC estimate $s_{2s}$ for each constellation point $s_1[j]$ |
| 9 | Get sliced MRC estimate $s_{1s}$ for each constellation point $s_2[j]$ |
| 10 | Get partial distance $d_{ps1} = t_{1a} - t_{1c}$ for pair $(s_1, s_{2s})$ for each $s_1[j]$ |
| 11 | Get total distance $d_{s1} = d_{ps1} + t_{1b} - t_{1d} + t_{1e}$ for pair $(s_1, s_{2s})$ for each $s_1[j]$ |
| 12 | Get partial distance $d_{ps2} = t_{2b} - t_{2d}$ for pair $(s_{1s}, s_2)$ for each $s_2[j]$ |
| 13 | Get total distance $d_{s2} = d_{ps2} + t_{2a} - t_{2c} + t_{2e}$ for each sliced pair $(s_{1s}, s_2)$ for $s_2[j]$ |
| 14 | Find LLR of each bit $b_i$ of $s_1[j]$ |
| 15 | Find LLR of each bit $b_i$ of $s_2[j]$ |

*FIG. 2*

| MODES | $r^T$ | $h_1^T$ | $h_2^T$ |
|---|---|---|---|
| 2X2 SM | $[r_1 \ r_2]$ | $[h_{11} \ h_{21}]$ | $[h_{12} \ h_{22}]$ |
| 1X2 SIMO | $[r_1 \ r_2]$ | $[r_{11} \ r_{21}]$ | |
| 2X3 SM | $[r_1 \ r_2 \ r_3]$ | $[r_{11} \ r_{21} \ r_{31}]$ | $[r_{12} \ r_{22} \ r_{32}]$ |
| 1X3 SIMO | $[r_1 \ r_2 \ r_3]$ | $[r_{11} \ r_{21} \ r_{31}]$ | |
| 2X2 STBC | $[r_{1,T} \ r_{2,T} \ r_{1,2T}^* \ r_{2,2T}^*]$ | $[r_{11} \ r_{21} \ r_{12}^* \ r_{22}^*]$ | $[r_{12} \ r_{22} \ -r_{11}^* \ -r_{21}^*]$ |
| 2X3 STBC | $[r_{1,T} \ r_{2,T} \ r_{3,T} \ r_{1,2T}^* \ r_{2,2T}^*]$ | $[r_{11} \ r_{21} \ r_{31} \ r_{12}^* \ r_{22}^* \ r_{32}^*]$ | $[r_{12} \ r_{22} \ r_{32} \ -r_{11}^* \ -r_{21}^* \ -r_{31}^*]$ |
| 2X1 STBC | $[r_{1,T} \ r_{2T}^*]$ | $[r_{11} \ r_{12}^*]$ | $[h_{12} \ -h_{11}^*]$ |
| 1X1 SISO | $[r_1]$ | $[r_{11}]$ | |

*FIG. 3*

| OPERATION NUMBER | 2X2 SM | 1X2 SIMO | 2X3 SM | 1X3 SIMO | 2X2 STBC | 2X3 STBC | 2X1 STBC | 1X1 SISO |
|---|---|---|---|---|---|---|---|---|
| 1 | Y | Y | Y | Y | Y | Y | Y | Y |
| 2 | Y | Y | Y | Y | Y | Y | Y | Y |
| 3 | Y | | Y | | | | | |
| 4 | Y | | Y | | | | | |
| 5 | Y | Y | Y | Y | Y | Y | Y | Y |
| 6 | Y | Y | Y | Y | Y | Y | Y | Y |
| 7 | Y | | Y | | | | | |
| 8 | Y | | Y | | | | | |
| 9 | Y | Y | Y | Y | Y | Y | Y | Y |
| 10 | Y | | Y | | Y | Y | Y | |
| 11 | Y | | Y | | Y | Y | Y | |
| 12 | Y | Y | Y | Y | | | | |
| 13 | Y | | Y | | Y | Y | Y | Y |
| 14 | Y | | Y | | Y | Y | Y | |
| 15 | Y | | Y | | Y | Y | Y | |

FIG. 4

UNIFIED MULTI-MODE RECEIVER DETECTOR

BACKGROUND

Wireless network, including wireless metropolitan area networks (WMAN) such as those compliant with the IEEE standard 802.16.x (WiMAX), may use multiple antennas on the transmitters and receivers, referred to as Multiple-Input Multiple-Output (MIMO), to communicate in order cancel interference from adjacent cells. Wireless networks may communicate using Orthogonal Frequency Division Multiplexing (OFDM) signaling. An OFDM signal is comprised of multiple sub-carriers each modulated at a symbol rate equal to the reciprocal of the frequency separation. MIMO schemes are often implemented with OFDM signaling as OFDM provides for easy characterizing of channel frequency response.

For wireless transmissions where high data rates and high signal to interference and noise ratio (SINR) are desired, a wireless MIMO receiver may operate in a spatial (de)multiplexing (SM) mode to estimate the transmitted signal. For wireless transmissions where increased coverage at low SINR is desired, the wireless MIMO receiver may operate in a space-time block (de)coding (STBC) mode. In order to match the transmission to the channel conditions, the MIMO receiver scheme may switch between SM and STBC modes (detection modes) and/or may adapt the number of received sub-streams (RF chains) depending on the operating power mode and channel conditions. The MIMO receiver may need to switch between the detection modes with minimum latency.

The MIMO receivers may include a plurality of different detectors (e.g., maximum ratio combining (MRC), minimum mean squared error (MMSE), maximum likelihood (ML)) to account for the different MIMO modes. The appropriate detector may be enabled based on the spatial operational MIMO mode. Having multiple MIMO detectors requires silicon area for each detector and may require complicated data interfaces.

BRIEF DESCRIPTION OF THE DRAWINGS

The features and advantages of the various embodiments will become apparent from the following detailed description in which:

FIG. 2 illustrates a table of example discrete simplified soft output ML detector (SMLD) operations, according to one embodiment;

FIG. 3 defines a table of column vectors of received data (r) and channel frequency response matrix (h) for each of the various MIMO configurations/detection modes, according to one embodiment; and FIG. 4 illustrates a table indicating which operations are required for the various MIMO configurations/detection modes, according to one embodiment.

DETAILED DESCRIPTION

Figure 1:
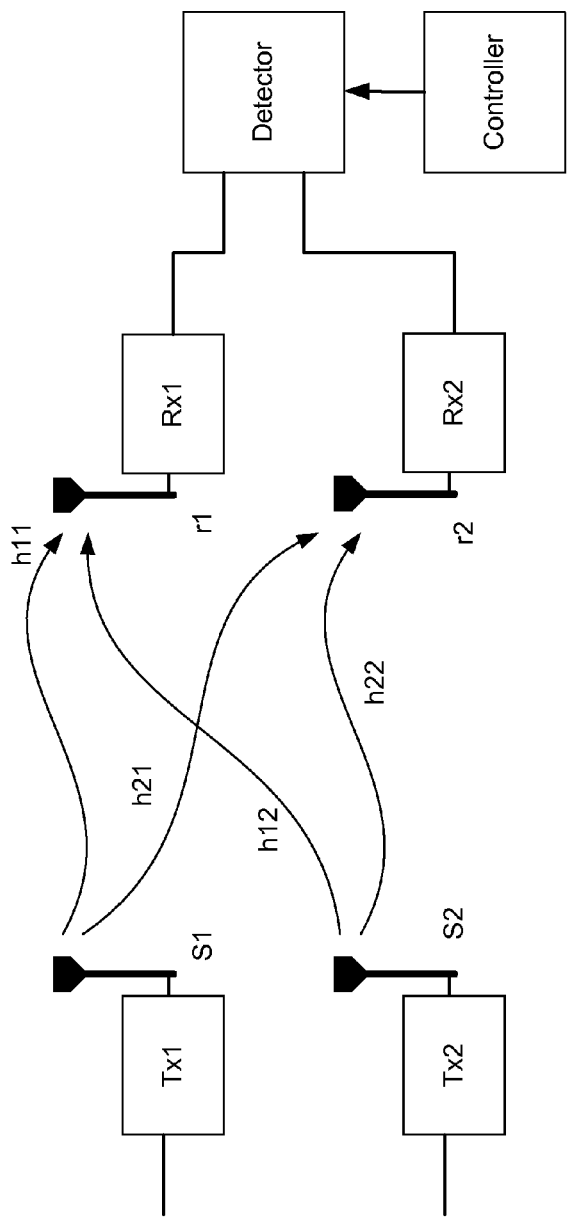
FIG. 1 illustrates an example MIMO system, according to one embodiment.

FIG. 1 illustrates an example MIMO system. The system includes 2 transmitter antennas (Tx1, Tx2) and two receiver antennas (Rx1, Rx2). Tx1, Tx2 transmit signals s1, s2 respectively to both Rx1 and Rx2 via an associated channel matrix (h11, h12, h21, h22). The received signals r1, r2 are equal to the associated channel matrix multiplied by the associated transmitted signals plus noise. Rx1 and Rx2 are connected to a detector that estimates the transmitted signals from the received signals. A controller may control the operation of the detector.

Maximum likelihood detectors (MLD) can be used in spatial (de)multiplexing (SM) mode to estimate the transmitted signal from the received signal. The MLD compares the received signal with all possible transmitted signals and estimates s according to its closest match. At the receiver, the most likely transmitted signal is identified as $S_{mL}=\arg\min (s_j \in \{s_1, s_2, \ldots, s_K\})\{\|r-H\,s_j\|^2\}$, where the search for minima for a M-QAM constellation is conducted for all $M^{N_t}$ possibilities in s, where $N_t$ is the number of transmitter antennas in the MIMO system and M is the number of constellation points. The MLD may also deliver the reliability values associated the most likely transmitted signal, which are known as soft-decision or Log-likelihood ratio (LLR) outputs.

The MLD can be simplified by scanning the hypotheses for all transmitting antennas except one, and finding the remaining signal by applying maximum ratio combining (MRC) and slicing. Using the simplified soft output MLD (SMLD) reduces the search for possible constellations for s to $M^{N_t-1}$ (by a factor of 1/M). For a MIMO system having 2 transmitters (2×$N_r$ MIMO) $H=[h_1\ h_2]$ where the column vectors $h_1$ and $h_2$ are the $N_r$×1 channel gain vectors corresponding to the 2 transmitted signal $s_1$ and $s_2$. The SMLD performs SM on a 2×Nr MIMO as follows.

All the possible constellation points for $s_1$ are scanned. For each $s_1$ hypothesis the ML solution of $s_2$ is found by MRC and slicing, such that $$s_{2s}(r,s_1)=\text{slice}\{(\|h_2\|^2)^{-1}h_2^H r-(\|h_2\|^2)^{-1}h_2^H h_1 s_1\} \quad \text{(Equation 1A)}$$

The Euclidean distances $d_1$ for each $s_1$ can be calculated as $$d_1(s_1, s_{2s}) = +\underbrace{\|h_1\|^2|s_1|^2}_{t1a} + \underbrace{\|h_2\|^2|s_{2s}|^2}_{t1b} - \quad \text{(Equation 2A)}$$
$$\underbrace{2\text{Re}\{(r^H h_1)s_1\}}_{t1c} - \underbrace{2\text{Re}\{(r^H h_2)s_{2s}\}}_{t1d} +$$
$$\underbrace{2\text{Re}\{s_1^H (h_1^H h_2)s_{2s}\}}_{t1e}$$

Note that the terms t1a-t1e are used to name the product terms they fall below.

Note that the energy of the received signal $\|r_1\|^2$ is crossed out because the value is same for each $s_1$ and need not be considered. For each bit $b_i$ of stream $s_1$, the $d_1$ is partitioned as $$d_{1+}=\{d_1\}|_{b_i=1} \text{ and } d_{1-}=\{d_1\}|_{b_i=0} \quad \text{(Equation 3A)}$$

The LLR of each $b_i$ is calculated as $$LLR(b_i)|_{s1}=\min\{d_{1+}\}-\min\{d_{1-}\} \quad \text{(Equation 4A)}$$

The same process is followed for all the possible combinations of $s_2$ $$s_{1s}(r,s_1)=\text{slice}\{(\|h_1\|^2)^{-1}h_1^H r-(\|h_1\|^2)^{-1}h_1^H h_2 s_2\} \quad \text{(Equation 1B)}$$

$$d_2(s_{1s}, s_2) = +\underbrace{\|h_1\|^2|s_{1s}|^2}_{t2a} + \underbrace{\|h_2\|^2|s_2|^2}_{t2b} - \quad \text{(Equation 2B)}$$
$$\underbrace{2\text{Re}\{(r^H h_1)s_{1s}\}}_{t2c} - \underbrace{2\text{Re}\{(r^H h_2)s_2\}}_{t2d} +$$
$$\underbrace{2\text{Re}\{s_{1s}^H (h_1^H h_2)s_2\}}_{t2e}$$

$$d_{2+}=\{d_2\}|_{b_i=1} \text{ and } d_{2-}=\{d_2\}|_{b_i=0} \quad \text{(Equation 3B)}$$

$$LLR(b_i)|_{s2}=\min\{d_{2+}\}-\min\{d_{2-}\} \quad \text{(Equation 4B)}$$

The SMLD provides improved packet error rates (PER) for frequency selective channels, especially in presence of mutual interference. The SMLD scheme described above for a $2 \times N_r$ MIMO SM mode may be utilized for other detection modes.

In a $2 \times Nr$ MIMO STBC mode having an orthogonal H, $\|h_1\|^2 = \|h_2\|^2$ and $h_1^H h_2 = 0$. Therefore the maximum likelihood of for $s_1$ is independent of and $s_2$ and vice versa, such that $$s_{2s}(r,s_1) = \text{slice}\{(\|h_2\|^2)^{-1} h_2^H r\}; \; s_{1s}(r,s_2) = \text{slice}\{(\|h_1\|^2)^{-1} h_1^H r\} \quad \text{(Equations 1C, 1D)}$$

Since the MRC contribution is independent of search variable, the MRC calculations of the SMLD are not required. Accordingly the Euclidean distance calculations can exclude common and uncorrelated values, such that $$d_1(s,s_{2s}) = \|r\|^2 + \|h_1\|^2 |s|^2 + \|h_2\|^2 |s_{2s}|^2 - 2\,Re\{(r^H h_1)s\} - 2\,Re\{(r^H h_2)s_{2s}\} + 2\,Re\{s_1^H(h_1^H h_2)s_{2s}\} \quad \text{(Equation 2C)}$$

$$d_2(s_{1s},s) = \|r\|^2 + \|h_1\|^2 |s_{1s}|^2 + \|h_2\|^2 |s|^2 - 2\,Re\{(r^H h_1)s_{1s}\} - 2\,Re\{(r^H h_2)s\} + 2\,Re\{s_{1s}^H(h_1^H h_2)s_2\} \quad \text{(Equation 2D)}$$

While the SMLD framework may be the same for SM and STBC detection modes, the amount of computation that is actually utilized for the STBC MIMO is much less. Dividing the SMLD computations into discrete operations and enabling the appropriate operations based on mode enables a single SMLD to be utilized for both SM and STBC detection modes. Using the SMLD for STBC where computations not required can be skipped makes using SMLD for STBC an efficient option since excess operations will not be performed. Using SMLD for STBC results in improved packet error rates compared to other detectors typically used for STBC (e.g., MRC).

FIG. 2 illustrates a table of example discrete SMLD computational operations. It should be noted that the t parameters (e.g., $t_{1a}, t_{2b}$) defined in operations 10-13 refer to the various terms in the Euclidean distance equations (Equations 2A-D, though the terms are only displayed below equations 2A-B). While some operations must be completed before others can begin, the discrete computational operations are not limited to this order. After decomposing the SMLD operations into various discrete computational operations (the common computational thread), the SMLD may be implemented in hardware (programmable engine, hard coded logic for ASIC), software, firmware or some combination thereof. The SMLD may be architected to accommodate bypassing of certain computational operations. This enables a unified implementation for both SM and STBC detection modes (unified detector).

The number of operations that are activated depends on the MIMO configuration ($N_t \times N_r$) and the detection mode (e.g., SM, STBC). For example, WiMax OFDM access systems may have between 1-2 transmitters and 1-3 receivers. The MIMO systems (2×2, 2×3) may be operated in either SM or STBC detection mode. A controller within the MIMO receiver can set the SMLD for the appropriate configuration.

FIG. 3 illustrates a table of the transposed column vectors $r^T$, $h_1^T$ and $h_2^T$ for each of the various MIMO configurations/operational modes. The initial operation of the SMLD is to extract these column vectors so that the other computations can be performed. It should be noted that there is no $h_2^T$ value for MIMO systems having a single transmitter (Single-Input Multiple-Output (SIMO) or Single-Input Single-Output (SISO)).

FIG. 4 illustrates a table indicating which operations are required for the various MIMO configurations/detection modes. The MIMO systems operating in SM mode (2×2 SM, 2×3 SM) require all of the operations. The MIMO systems operating in STBC mode (2×2 STBC, 2×3 STBC, 1×3 STBC) may skip operations 3, 4, 6, 8, 9, 11 and 13. The SIMO systems (1×2 SIMO, 1×3 SIMO) and the SISO system may additionally skip operations 12 and 15.

The unified SMLD eliminates the need for multiple detector engines in the receiver. This may reduce the die area used for detectors and may simplify the control structure. The unified SMLD would have high (e.g., 100%) utilization and would require only a single data interface. The unified SMLD may also lower power consumption.

The unified detector has been described with respect to an SMLD detector and SM and STBC detection modes but is not limited thereto. Rather, other type of detectors now known or later discovered may be utilized if the computational operations can form a common framework for various detection modes and/or MIMO configurations in which the computational operations performed are based on some combination of detection modes and MIMO configuration.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

What is claimed:

1. An apparatus comprising:
a multiple input multiple output (MIMO) receiver including one or more receiver antennas to receive wireless signals from one or more transmitter antennas;
a unified detector to receive the wireless signals from the MIMO receiver and to estimate signals transmitted from the one or more transmitter antennas, wherein the unified detector supports a plurality of detection modes and a plurality of configurations, wherein the unified detector includes a plurality of discrete computational operations that are to be individually selected for execution, and wherein selection of individual discrete operations from the plurality of discrete computational operations to be executed is based on detection mode selected from the plurality of detection modes and number of transmitters that transmit the wireless signals to the MIMO receiver; and
a controller to select the detection mode.

2. The apparatus of claim 1, wherein the plurality of discrete computational operations include maximum ratio combining (MRC) operations.

3. The apparatus of claim 1, wherein the unified detector is a simplified maximum likelihood detector to estimate the signals transmitted by comparing the received signals to possible transmitted signals for all but one transmitter antenna.

4. The apparatus of claim 1, wherein the MIMO receiver is an Orthogonal Frequency Division Multiplexing (OFDM) receiver.

5. The apparatus of claim 1, wherein the plurality of detection modes supported include spatial (de)multiplexing (SM) detection mode and Space-time block (de)coding (STBC) detection mode and the plurality of configurations supported include single input single output (SISO) and single input multiple output (SIMO).

6. The apparatus of claim 1, wherein the unified detector is implemented in some combination of hardware, software and firmware.

7. The apparatus of claim 1, wherein the unified detector receives and estimates Orthogonal Frequency Division Multiplexing (OFDM) signals, is a simplified maximum likelihood detector, supports spatial (de)multiplexing (SM) and Space-time block (de)coding (STBC) detection modes, and supports single input single output (SISO) and single input multiple output (SIMO) configurations.

8. The apparatus of claim 1, wherein the individual discrete operations selected to be executed for a single transmitter transmitting the OFDM signals include a subset of the plurality of discrete computational operations.

9. The apparatus of claim 5, wherein
the individual discrete operations selected to be executed for the SM detection mode include the plurality of discrete computational operations, and
the individual discrete operations selected to be executed for the STBC detection mode include a subset of the plurality of discrete computational operations.

10. An apparatus comprising:
a multiple input multiple output (MIMO) receiver to receive Orthogonal Frequency Division Multiplexing (OFDM) signals; and
a unified detector to estimate transmitted signals from the received signals, wherein
the unified detector supports a plurality of detection modes including spatial (de)multiplexing (SM) detection mode and Space-time block (de)coding (STBC) detection mode,
the unified detector includes a plurality of discrete computational operations that are to be individually selected for execution, wherein selection of individual discrete operations from the plurality of discrete computational operations to be executed is based on detection mode selected from the plurality of detection modes,
the individual discrete operations selected to be executed for the SM detection mode include the plurality of discrete computational operations, and
the individual discrete operations selected to be executed for the STBC detection mode include a subset of the plurality of discrete computational operations.

11. The apparatus of claim 10, wherein the unified detector is a simplified maximum likelihood detector to estimate the transmitted signals by comparing the received signals to possible transmitted signals for all associated transmitting antennas but one.

12. The apparatus of claim 10, wherein which the selection of individual discrete operations from the plurality of discrete computational operations to be executed is further based on number of transmitters that transmit the OFDM signals to the MIMO receiver.

13. The apparatus of claim 12, wherein the individual discrete operations selected to be executed for a single transmitter transmitting the OFDM signals include a subset of the plurality of discrete computational operations.

14. The apparatus of claim 10, wherein the unified detector is implemented in hardware.

15. The apparatus of claim 10, wherein the unified detector is implemented in software.

16. The apparatus of claim 10, wherein the unified detector includes a single data interface.

17. The apparatus of claim 10, wherein the plurality of discrete computational operations include maximum ratio combining (MRC) operations.

18. An apparatus comprising:
a multiple input multiple output (MIMO) receiver to receive signals; and
a unified detector to estimate transmitted signals from the received signals, wherein the unified detector includes a plurality of discrete computational operations that are to be individually selected for execution, and wherein selection of individual discrete operations from the plurality of discrete computational operations to be executed is based on detection mode selected to estimate the transmitted signals and number of transmitters that transmit the signals to the MIMO receiver.

19. The apparatus of claim 18, wherein the unified detector is a simplified maximum likelihood detector to estimate the transmitted signals by comparing the received signals to possible transmitted signals for all associated transmitting antennas but one.

20. The apparatus of claim 18, wherein the plurality of discrete computational operations include maximum ratio combining (MRC) operations.

* * * * *